Dec. 10, 1940.   W. W. MOHR   2,224,231
VALVE CONSTRUCTION
Filed May 19, 1939
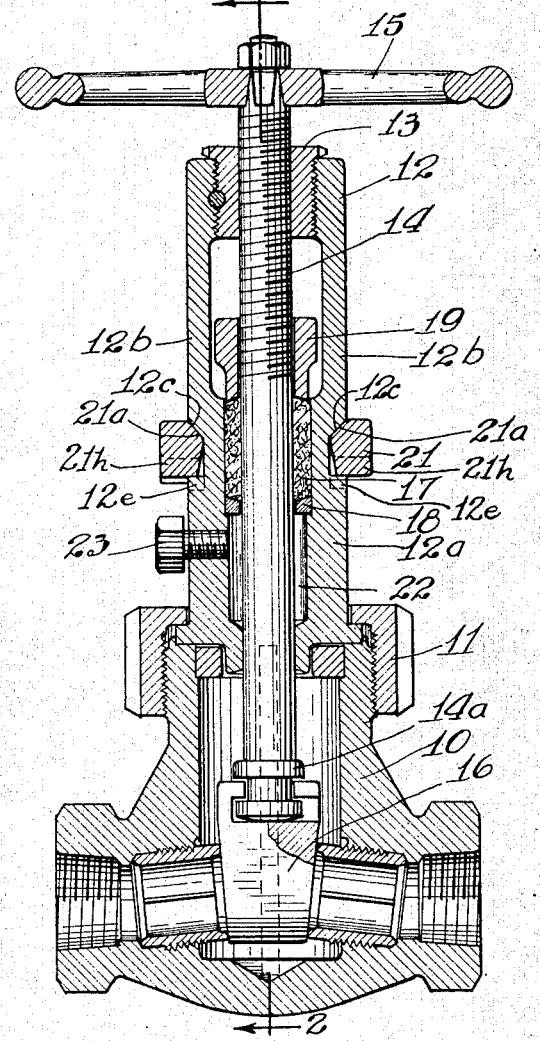
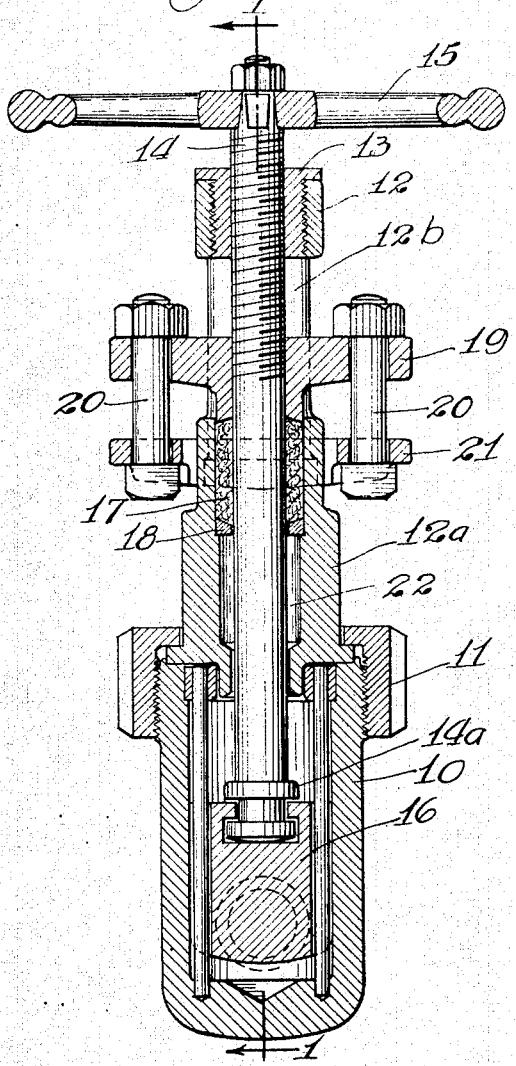
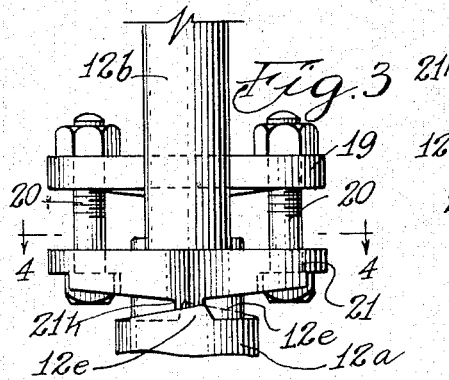
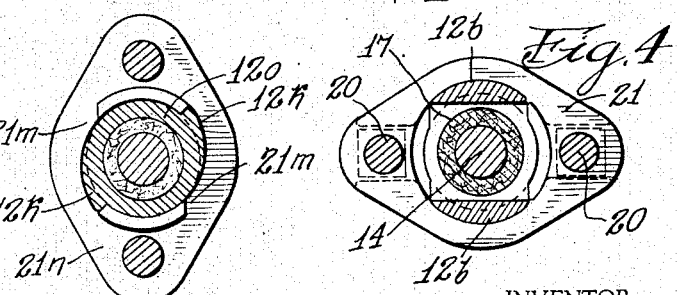
INVENTOR.
WALTER W. MOHR.
BY Albert E. Bell
ATTORNEY.

Patented Dec. 10, 1940

2,224,231

UNITED STATES PATENT OFFICE 2,224,231

VALVE CONSTRUCTION

Walter W. Mohr, Calumet City, Ill., assignor to The Edward Valve & Manufacturing Co. Inc., East Chicago, Ind., a corporation of Indiana Application May 19, 1939, Serial No. 274,500

6 Claims. (Cl. 251—49)

In connection with valves of the class requiring a gland packing around the operating stem or rod of the valve, and in the bonnet used to close the body of the valve and support the outer portion of said stem or rod, it has heretofore been the practice to construct a flange integrally with the bonnet of the valve, to engage the bolts used to move the gland forcibly against the gland packing, to hold the latter in place around the stem of the valve. Such constructions, particularly where the bonnets are steel forgings, for example, in high pressure valves, have been open to the objection that the bonnets have required relatively costly dies, and that whether the bonnets are made of steel or other material, the said gland flanges have materially interfered with repacking the valve stems, particularly where the valves are used on high pressure steam lines, and must be repacked while very hot. By my invention I provide the bonnet with a gland flange that is separate from the bonnet structure, and which may readily and quickly be applied to the bonnet and as readily and quickly be moved from its operative position thereon. This materially cheapens the bonnet construction and gives the structure the further advantage of materially increasing the clearances afforded for repacking purposes. Additionally, my improved construction does not require accurate machining and fitting operations to insure proper alignment of the gland flange and uniform distribution of the strains exerted on the flange. My invention is applicable to valves generally of the type requiring packing of the kind referred to, regardless of the material of which the valves may be made.

My invention will more readily be understood by reference to the accompanying drawing illustrating a preferred embodiment thereof, in which Fig. 1 is a vertical, sectional view through a gate valve in accordance with my invention, taken along the line 1—1 in Fig. 2, Fig. 2 is a vertical, sectional view through the structure shown in Fig. 1 taken along the line 2—2 in the latter figure, Fig. 3 is a side elevation of the gland flange structure, Fig. 4 is a horizontal, sectional view taken along the line 4—4 in Fig. 3, and Fig. 5 is a horizontal, sectional view of a modified gland flange structure.

Similar numerals refer to similar parts throughout the several views.

As shown in Figs. 1 and 2, a valve body 10 has secured thereto by a threaded collar 11, a bonnet 12, extending upwardly to support at its upper end, an externally and internally threaded bushing 13 engaging corresponding threads in the upper end portion of the bonnet and on the valve stem 14 respectively.

The stem 14 has secured to its upper end a hand wheel 15 by which the stem is rotated to operate a gate 16 carried by the lower end of the stem to control fluid flow through the valve body 10.

The lower portion 12a of the bonnet is tubular to contain packing 17 around the stem 14, which packing is held in compressed condition against a metal ring 18 by a gland 19 held against the packing by bolts 20 (Fig. 2) connecting the gland with a gland flange 21 surrounding the portion 12a of the bonnet. Below the ring 18, the bonnet 12 is counterbored nearly to its lower end to form a condensation chamber 22 around the stem to collect any slight seepage from the cavity in the body 10, said chamber being provided with a threaded plug 23 for opening said chamber when desired. The lower end of the stem 14 carries a beveled flange 14a engaging a similarly beveled surface in the lower end of the bonnet 12 when the valve is open, to prevent leakage from the cavity in the valve body.

Above the stem packing 17, the bonnet 12 consists of two parallel and vertically extending arms 12b sufficiently spaced from each other to receive the gland 19 between them, said arms being sufficiently narrow in width so the opposite ends of the gland may project from between them to engage the bolts 20. The arms 12b are of sufficient length vertically to contain the gland 19 and provide a substantial clearance space vertically for repacking purposes. At their upper ends, the arms 12b merge into the tubular upper end of the bonnet supporting the bushing 13.

The outer diameter of the upper part of the portion 12a of the bonnet, is substantially smaller than the outer diameter of the bonnet arms 12b, said arms having at their lower ends where they merge with the bonnet portion 12a, outer inclined faces 12c engaging similarly inclined faces 21a on the gland flange 21.

The gland flange 21 is provided with a central opening which is of larger radius adjacent the openings for the bolts 20, than it is at its midportions. The portions of larger radius are of slightly greater extent laterally of the flange 21, than the width of the arms 12b; the diameter of the portions of larger radius is slightly greater than the outside diameter of the arms 12b; and the diameter of the portions of smaller radius is just enough greater than the diameter of the bonnet portion 12a immediately below the arms 12b, so that the flange 21 may be turned freely on the bonnet when it is in place thereon as shown in Fig. 1, before the bolts 20 are put in place.

As a result of the construction described, before the bonnet 12 is assembled in place on the body 10, and before the stem 14 is assembled in the bonnet, the gland flange may be placed on the bonnet in the position shown in Figs. 1 and 2, by aligning the opening portions of larger radius with the arms 12b, in which angular position the flange 21 will slip freely over the arms 12b, and then, when the flange 21 is in a plane just below the arms 12b, it may be rotated substantially 90°, thereby moving the portions of smaller radius, under the lower inclined ends 12c of the arms 12b which, for that position of the flange, prevents its movement upwardly. The stem 14 is then put in place through the gland 19, the packing 17 is inserted, and the gland is drawn down against the packing by the bolts 20, the position of the flange 21 last referred to, being such as to receive said bolts. The lower surface of the flange 21 is provided with channels to receive the heads of the bolts 20, to prevent turning of the bolts when the nuts thereon are turned.

The lower inclined end surfaces 12c of the arms 12b are preferably spherically convex, and the corresponding upper surfaces 21a of the flange 21 engaging therewith are preferably similarly concave, so the flange may readily adjust itself on the bonnet to proper position when the nuts on the bolts 20 are tightened, to equalize the strains thereby produced on the gland flange.

In Figs. 3 and 4, I illustrate a wedge lock that may be employed to stop and hold the gland flange 21 in its operative position on the bonnet 12. With this construction, the flange 21 is provided with two downwardly extending wedge-shaped lugs 21h on its lower surface midway between the bolts 20, for tightly engaging wedge-shaped members 12e on the lower portion of the bonnet 12, when the flange 21 is turned to a position in alignment with the ends of the gland 19, in which position the flange 21 is tightly pressed against the lower inclined ends of the bonnet arms 12b.

In Fig. 5 I illustrate a bonnet and flange construction in which the tubular portion 12g is provided with radially extending wedge-shaped lugs 12k engaging similar conformations 21m on a gland flange 21n to wedge and lock the gland flange on the bonnet when the flange is in alignment with the gland, and the valve construction may be the same in other respects as described in connection with Figs. 1, 2 and 3.

From the above it will be observed that the dies required to make drop-forged steel bonnets of the kind described, are much cheaper and simpler than where integral gland flanges are required to be parts of the bonnets; also that the gland flanges may readily be made self-adjusting on the bonnets. It will also be observed that in repacking a valve provided with a gland flange of the kind described, after the gland bolts are removed, the gland flange may readily be turned into alignment with the bonnet arms, thereby affording free access to the valve stem below the gland, without interference of any kind from the gland flange.

While I have shown my invention in the particular embodiments above described, it will be understood that I do not limit myself thereto as I may employ equivalents thereof without departing from the scope of the appended claims.

What I claim is:

1. In a valve construction, the combination of a body, a bonnet secured to said body, a valve stem extending through said bonnet, said bonnet having a tubular portion adjacent said body, opposite spaced arms extending outwardly from said tubular portion and substantially parallel with said stem and supporting at their outer ends an outer bearing for said stem, a packing gland on said stem and extending into a bore therefor in said tubular portion around said stem and having opposite end portions projecting laterally from between said arms beyond the outer surface of said tubular portion, a gland flange around said tubular portion and having end portions for alignment with said gland end portions, said gland flange being movable angularly on said tubular portion from alignment with said gland end portions to alignment with said arms, and gland bolts extending through said gland end portions and said flange end portions for the aligned position of said gland and said flange, said flange and said tubular portion having cooperating parts restraining axial movement of said flange relatively to said tubular portion and towards said gland for the aligned position of said gland and said flange, said flange and said tubular portion having cooperating wedge-shaped projections limiting angular movement of said flange when it reaches its position of alignment with said gland.

2. In a valve construction, the combination of a body, a bonnet secured to said body, a valve stem extending through said bonnet, said bonnet having a tubular portion adjacent said body, opposite spaced arms extending outwardly from said tubular portion and substantially parallel with said stem and supporting at their outer ends an outer bearing for said stem, a packing gland on said stem and extending into a bore therefor in said tubular portion around said stem and having opposite end portions projecting laterally from between said arms beyond the outer surface of said tubular portion, a gland flange around said tubular portion and having end portions for alignment with said gland end portions, said gland flange being movable angularly on said tubular portion from alignment with said gland end portions to alignment with said arms, and gland bolts extending through said gland end portions and said flange end portions for the aligned position of said gland and said flange, said flange and said tubular portion having cooperating parts restraining axial movement of said flange relatively to said tubular portion and towards said gland for the aligned position of said gland and said flange, said flange and said tubular portion having cooperating wedge-shaped projections limiting angular movement of said flange when it reaches its position of alignment with said gland, said flange having openings between its said cooperating parts clearing said parts on said tubular portion and also clearing said arms for the position of said flange end portions in alignment with said arms, whereby said flange in its latter position may be moved freely along said arms.

3. In a valve construction, the combination of a body, a bonnet secured to said body, a valve stem extending through said bonnet, said bonnet having a tubular portion adjacent said body, opposite spaced arms extending outwardly from said tubular portion and substantially parallel with said stem and supporting at their outer ends an outer bearing for said stem, a packing gland on said stem and extending into a bore therefor in said tubular portion around said stem and having opposite end portions projecting laterally from between said arms beyond the outer surface of said tubular portion, a gland flange around said tubular portion and having end portions for alignment with said gland end portions, said gland flange being movable angularly on said tubular portion from alignment with said gland end portions to alignment with said arms, and gland bolts extending through said gland end portions and said flange end portions for the aligned position of said gland and said flange, said flange and said tubular portion having cooperating parts restraining axial movement of said flange relatively to said tubular portion and towards said gland for the aligned position of said gland and said flange, said flange and said tubular portion having cooperating wedge-shaped projections limiting angular movement of said flange when it reaches its position of alignment with said gland, said cooperating parts having cooperating concave and convex spherical surfaces whereby said flange is self-adjusting to equalize strains thereon.

4. In a valve construction the combination of a bonnet having a tubular portion for attachment to a valve body and having opposite spaced projections extending radially outwardly from said tubular portion, and a gland flange around and movable angularly relatively to said tubular portion, said flange having end portions movable to a first position between said projections and to a second position substantially in line with said projections, said flange and said projections having cooperating surfaces restraining axial movement of said flange relatively to said tubular portion and towards said projections for said first position of said flange, said flange and said tubular portion having cooperating wedge-shaped projections limiting angular movement of said flange when it reaches its said first position.

5. In a valve construction the combination of a bonnet having a tubular portion for attachment to a valve body and having opposite spaced projections extending radially outwardly from said tubular portion, and a gland flange around and movable angularly relatively to said tubular portion, said flange having end portions movable to a first position between said projections and to a second position substantially in line with said projections, said flange and said projections having cooperating surfaces restraining axial movement of said flange relatively to said tubular portion and towards said projections for said first position of said flange, said flange and said tubular portion having cooperating wedge-shaped projections limiting angular movement of said flange when it reaches its said first position, said flange having openings between its said cooperating surfaces clearing said projections on said tubular portion for said second position of said flange, whereby said flange in its said second position may be moved freely onto and from said tubular portion.

6. In a valve construction the combination of a bonnet having a tubular portion for attachment to a valve body and having opposite spaced projections extending radially outwardly from said tubular portion, and a gland flange around and movable angularly relatively to said tubular portion, said flange having end portions movable to a first position between said projections and to a second position substantially in line with said projections, said flange and said projections having cooperating surfaces restraining axial movement of said flange relatively to said tubular portion and towards said projections for said first position of said flange, said flange and said tubular portion having cooperating wedge-shaped projections limiting angular movement of said flange when it reaches its said first position, said cooperating surfaces being respectively spherically concave and convex whereby said flange is self-adjusting to equalize strains thereon.

WALTER W. MOHR.